US010332116B2

(12) United States Patent
Peram et al.

(10) Patent No.: US 10,332,116 B2
(45) Date of Patent: Jun. 25, 2019

(54) SYSTEMS AND METHODS FOR FRAUDULENT ACCOUNT DETECTION AND MANAGEMENT

(71) Applicant: NETFLIX, INC., Los Gatos, CA (US)

(72) Inventors: Rudra Peram, Los Gatos, CA (US); Jason Chan, Los Gatos, CA (US)

(73) Assignee: Netflix, Inc., Los Gatos, CA (US)

( * ) Notice: Subject to any disclaimer, the term of this patent is extended or adjusted under 35 U.S.C. 154(b) by 509 days.

(21) Appl. No.: 14/876,613

(22) Filed: Oct. 6, 2015

(65) Prior Publication Data
US 2017/0098219 A1    Apr. 6, 2017

(51) Int. Cl.
| G06Q 40/00 | (2012.01) |
| G06Q 20/40 | (2012.01) |
| H04L 29/08 | (2006.01) |
| G06Q 20/32 | (2012.01) |
| G06Q 30/02 | (2012.01) |

(52) U.S. Cl.
CPC ..... *G06Q 20/4016* (2013.01); *G06Q 20/3224* (2013.01); *G06Q 30/0225* (2013.01); *H04L 67/306* (2013.01)

(58) Field of Classification Search
None
See application file for complete search history.

(56) References Cited

U.S. PATENT DOCUMENTS

| 8,280,833 B2* | 10/2012 | Miltonberger | G06Q 10/067 705/348 |
| 9,031,877 B1* | 5/2015 | Santhana | G06Q 20/4016 705/50 |
| 2005/0122965 A1* | 6/2005 | Heinla | G06Q 20/102 370/357 |
| 2008/0249931 A1* | 10/2008 | Gilder | G06Q 20/04 705/39 |
| 2014/0304054 A1* | 10/2014 | Orun | G06Q 30/0225 705/14.26 |
| 2016/0044054 A1* | 2/2016 | Stiansen | H04L 63/1416 726/24 |

* cited by examiner

Primary Examiner — Scott S Trotter
(74) Attorney, Agent, or Firm — FisherBroyles, LLP

(57) ABSTRACT

Provided herein are systems and methods of monitoring account activity in a streaming media environment. An exemplary system includes a monitoring system, an account creation and management system, and an account payment system. The monitoring system is coupled to the account creation and management system and the account payment system via a network. The processing device of the monitoring system retrieves account information for a first user account. Account information includes user consumption information and user payment information associated with the first user account. The processing device determines a fraudulent account score for the first user account based on at least one of the user consumption information, the user payment information, and account identification information. When the fraudulent account score exceeds an upper threshold, the processing device automatically deletes the first user account from at least one of the account creation and management system and the accounts payment system.

20 Claims, 4 Drawing Sheets

| USER CONSUMPTION DATABASE 300 | | | | | |
|---|---|---|---|---|---|
| User ID | Profile # | Title | % of Title | Date | Access Location |
| 302 → 1533 | 1 | Fast and Ferocious I | 1:37:00 | 2015-08-26 | U.S. C.D.N. Node 4 |
| 304 → 0707 | 3 | Fast and Ferocious II | 2:05:36 | 2015-08-23 | Brazil C.D.N. Node 2 |
| 306 → 0707 | 1 | Seoul Music | 2:05:36 | 2015-08-13 | San Jose, CA, USA |
| 308 → 5978 | 5978 | Alien Secrets of WWII | 0:00:30 | 2015-07-31 | Germany |

FIG. 3A

| USER PAYMENT DATABASE 320 | | | | |
|---|---|---|---|---|
| User ID | Primary Payment Source | Type | Number | Source Location |
| 322 → 1533 | Deutsche Bank | Credit | 123-456 | Germany |
| 324 → 4823 | PayPal | Online | 123-567 | San Jose, CA, USA |
| 326 → 0707 | Plano First Financial | Debit | 234-789 | Plano, TX, USA |
| 328 → 5978 | Chase Manhattan | Credit | 012-678 | NY, NY, USA |

FIG. 3B

| USER IDENTIFICATION DATABASE 340 | | | | |
|---|---|---|---|---|
| User ID | First Name | Last Name | Email | Creation Location |
| 342 → 1533 | Natalie | House | 7ab6@freeflix.com | Tuscon, AZ, USA |
| 344 → 4823 | Hannah | Mechum | h.mechum@email.com | Dallas, TX, USA |
| 346 → 0707 | xyz@abc.com | Jones | xyz@abc.com | Sao Paulo, SP, Brazil |
| 348 → 5978 | Pete | Chiaracatta | petey.c@domain.com | Camden, NJ, USA |

FIG. 3C

SYSTEMS AND METHODS FOR FRAUDULENT ACCOUNT DETECTION AND MANAGEMENT

TECHNICAL FIELD

The present disclosure relates generally to the detection and handling of fraudulent accounts and/or fraudulent activity associated with accounts in a network based environment.

BACKGROUND

As network-enabled devices and network technology have improved and been increasingly adopted around the world, more and more activities are being performed using local and remote devices in communication through wires or wirelessly. For example, e-commerce allows people to shop from virtually anywhere using a smartphone and a wireless network, such as a cellular network that covers a large geographic area. Increasingly, more and more media, including audio and video, is distributed to consumers over the Internet by service providers operating around the globe.

Those service providers are interested in attracting new customers, who are often required to create a customer account or a user account with any particular service the customers would like to use. Requiring users to create an account may permit a service provider to better provide a benefit to each particular user. For example, an audio streaming service may require users to establish user accounts. The audio streaming service may then collect information associated with that user account, such as preference information that allows the audio streaming service to recommend or provide content that the user is more likely to enjoy than randomly selected content or purely thematic content. In this way, the audio streaming service may provide a benefit to a user that the user may appreciate more than an alternative. For example, the audio streaming service may provide music that the user enjoys more than music played by local radio stations. By providing the improved service, the audio streaming service may be able to charge the user a usage or subscription fee. The user account may also include payment information, such as identifiers and access codes associated with one or more payment sources that permit the service provider to transact with the user on a subscription basis.

Many people may attempt fraud in connection with user accounts associated with such services. A conventional approach to preventing fraud has been to require verifiable information from the potential user at the time of sign up or account creation. For example, a service may require an email address in order to create a new account. The service may send a link or other information to the email address in order to verify that the actor seeking to create a new account has access to that email address. By requiring information from the user at the time of account creation, services may be able to prevent some amount of fraud. However, conventional approaches to fraud associated with user accounts have not been entirely satisfactory.

BRIEF DESCRIPTION OF THE DRAWINGS

FIG. 3A is an illustration of a database storing user consumption information that may be used by the account monitoring system of FIG. 1, according to some embodiments of the present disclosure.

FIG. 3B is an illustration of a database storing user payment information that may be used by the account monitoring system of FIG. 1, according to some embodiments of the present disclosure.

FIG. 3C is an illustration of a database storing user identification information that may be used by the account monitoring system of FIG. 1, according to some embodiments of the present disclosure.

Figure 1:
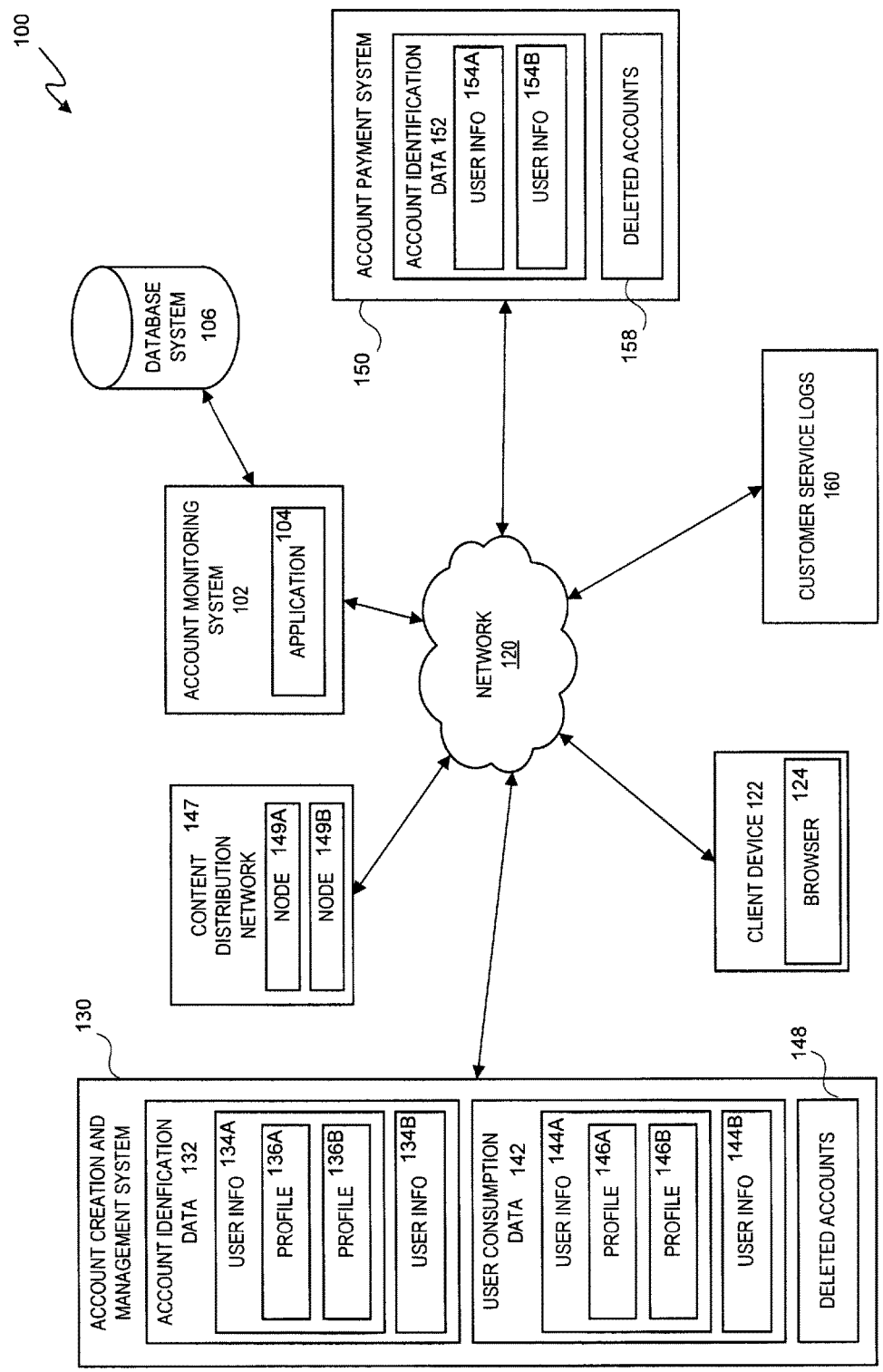
FIG. 1 is a block diagram of network environment including an account monitoring system that may detect and handle account-based fraud, according to some embodiments of the present disclosure.

These drawings will be better understood by those of ordinary skill in the art by reference to the following detailed description.

DETAILED DESCRIPTION

With references to the drawings briefly described above, exemplary applications of systems and methods according to the present disclosure are described in this section. These examples are provided to add context and aid in the understanding of the invention. It will thus be apparent to one skilled in the art that the present invention may be practiced without some or all of these specific details. In other instances, some well-known process steps have not been described in specific detail in order to avoid unnecessarily obscuring the present disclosure. Additionally, other applications of the concepts and principles described herein are possible, such that the following examples should not be taken as limiting. For example, while many of the examples disclosed herein are directed to the detection and management of fraudulent accounts and fraudulent activity in the context of a streaming video service, the principles and concepts described may be applied to provide more generally for the detection and management of fraud in other contexts in which there is some ongoing transactions associated with the streaming, downloading, or otherwise accessing of media items.

In the following detailed description, references are made to the accompanying drawings, which form a part of the description and in which are shown, by way of illustration, some specific embodiments of the present disclosure. Although these embodiments are described in sufficient detail to enable one skilled in the art to practice the invention, it is understood that these embodiments are not limiting, such that other embodiments may be used, and changes may be made without departing from the spirit and scope of the invention. For example, changes within the scope of this disclosure may include performing an operation on a different system or device, etc.

Devices, systems, and methods are provided for performing activities related to the detection and management of fraudulent accounts and the use of existing, legitimate accounts for the purpose of fraudulent activity. In various particular embodiments, the devices, systems or methods involve one or more devices in communication over a network to provide access to user account information from a variety of sources, such as a payments database and a user history or user consumption database. In some embodiments, these different sources may be accessed via different machines or different sets of machines, such as different computer clusters, in order to isolate different types of information for privacy purposes. For example, a different level of security may be required for payment information, such as credit card account numbers associated with a user, while other information associated with that user such as a username or email address may not require as high a level of security. Additionally, the separation of information may itself provide a heightened level of security for each individual type of information, because multiple servers or storage systems will need to be breached in order to obtain access to each separately stored category of information.

When a user of an online service, such as an audio streaming service or a video streaming service, directs his or her client device to communicate with the online service over a network or combination of networks, the user may be required to enter account identifying and authenticating information in order to access content for consumption. Content "consumption," as used in this disclosure, refers to the transmission of content in the form of one or more media files from a service provider system or device (or a third-party system, such as a content delivery network, operated on behalf of the service provider) to a user device. The user device may then render the information as audio and/or video through speakers and/or displays integrated into or coupled to the user device. Accordingly, when a feature film is streamed from an online streaming website, the feature film is considered to be "consumed." Similarly, when a media item is downloaded, the item may be considered to be "consumed" upon download or after the media item begins playing for the first time. The user may access streaming media or downloadable media by providing authentication information to the service provider system. For example, a user may be required to enter a username or password, and thereafter be provided with access to one or more the service provider's systems. In other embodiments, a cookie set in a browser executing on the user device may be used to authenticate the user to the service provider system.

In some embodiments of a streaming media system, a user may be required to set up or create a user account in order to access content. The streaming media system may require information such as, but not limited to, a username and a password. Other embodiments may further require payment information such as a credit card account number, a debit card account number, an online payment system account number or identifier. Embodiments may further require additional identification information, such as a first and last name of the user, address information such as postal code on its own or as part of a mailing address and/or a billing address, and/or an email address.

For example, a particular embodiment may require an email address (which may be used as a username), a password, and a payment source identifier. When the payment source identifier is an identifier of a credit account or a debit account, the user may be required to also enter a postal code or other address information that may be required by the credit account issuer or debit account issuer for the service provider to receive payment or for the service provider to request verification of the account. As part of an account creation process, a service provider may offer a free period or grace period (e.g. a "free trial") in which no charges may be withdrawn by the service provider. The time-limited free trial may be implemented by the service provider to permit potential users to access content during the limited free trial period to encourage the potential user to then pay for content accessible via the service provider or to subscribe to the provided service. After the user account has been created, the user may be able to access content from the service provider via one or more user devices.

During the account creation process, the service provider may require authentication or verification of one or more pieces of information provided by the user as part of the account creation process. For example, the service provider may send an email to the email address provided by the potential user. Additionally, the service provider may transmit payment source information to a payment service, such as a credit card company, to request verification that the identified account, such as a credit card account, exists and can be drawn upon by the service provider. The request for verification may include transmission of a first and last name and a ZIP code as required by the payment service. The payment service system may send a communication to the service provider system indicating whether or not the payment source information is valid and can be drawn upon.

Bad actors may seek to utilize and/or circumvent the account creation process for their own purposes. For example, a bad actor, which may be an individual or entity providing services to other individuals, may want to obtain a new user account in order to benefit from the free trial. For example, a person, referred to as a free trial abuser, may string together a series of free trial periods by stringing together new accounts that have the benefit of the free trial (e.g., at the end of a free trial period associated with a first account, that person may seek to acquire a second account having a new free trial). This may be referred to herein as free trial abuse.

Other bad actors may seek to use the account creation process to perform payment account verification, using the service provider as an intermediary. As an example, hackers may obtain account information associated with a plurality of user of a tax collection agency of the government. The account information may include government issued identification numbers, legal names, addresses, and/or financial account information such as a savings account number, a debit account number, or a credit account number. As more time passes after the breach in which they hackers obtained the account information, the information that they have becomes less valuable. This is because more time allows the victims of the data breach additional opportunities to take preventative measures, such as getting a new credit card number, etc. Thus, as time passes the information obtained in the breach may become less valuable on the black market, because the percentage of active account numbers included in the information is likely to decrease.

In order to better market or better assess the value of illicitly obtained personal data, the hackers may use an account creation system to test account numbers. A card runner, a hacker that sells account numbers in bulk, may either manually or programmatically attempt to create user accounts using the account creation system. In doing so, the card runner may enter information such as an email address, a name, a credit card number (the credit card number or other account number that the card runner is trying to verify), and/or address information obtained from a user data breach associated with another service provider, such as the tax collection agency. If the account creation process terminates with an active account, the card runner may be confident that the credit card number and other information needed to use the associated credit card account are valid and can be resold or used to obtain goods or services.

Additionally, bad actors may commit account fraud by using an existing account to access services or goods, while trying to avoid detection by the proper owner of the account.

For example, after a data breach a user's email address may be disclosed along with the user's password. Bad actors may access the user's email address and password and attempt to use those pieces of information to gain access to the user's account for their own purposes. For example, a bad actor may obtain a first user's email address and password from a data breach of a first website, and then try to use the first user's email address and password at a second website, such as the website of a streaming video service provider. If the email address and password are associated with an existing account of the second website, the bad actor may obtain access to that existing account. In some embodiments, the password used in connection with the first website may be used by a password cracking program as a basis for generating candidate passwords that the bad actor may be able to try to use in connection with the second website.

The present disclosure is directed to mitigating these and other types of fraud performed in connection with an account creation system.

Embodiments of the present disclosure include an account monitoring system or server that receives account information, such as consumption information, payment information, and/or identification information associated with a user account. Some embodiments of the present disclosure may provide for a time period during which no action is taken to stop or prevent fraudulent account creation and/or use. Accordingly, in some embodiments, no attempt may be made to prevent the generation of an account for fraudulent purposes. Information collected during the time period, such as during a free trial period, may be used to determine a fraudulent account score associated with that user account. The fraudulent account score may be a percentage-based score, a cumulative score, or a normalized score indicative of a likelihood that the scored account is fraudulent in some way, such as having been created for the purpose of verifying a stolen credit card account number, having been created as part of a free trial abuse scheme or service, or having been co-opted without permission or authorization by the rightful owner. When the fraudulent account score is above an upper threshold value, the account monitoring system may automatically delete the scored account.

As described herein, the deletion of an account may include storing or "mothballing" the account for a period of time prior to the permanent destruction or erasure of any and all information associated with the account. Accordingly, information associated with a deleted account, such as a username, and email address, a credit card account number, may be accessible to the account monitoring system for that period of time. For example, after a credit card account number has been associated with a user account created by a card runner, the account monitoring system may take actions when another attempt to use that credit card account number is made. In such an instance, the account monitoring system may prevent the creation of the account.

Additional information, such as geographic information may be obtained from a variety of sources and used in the detection of fraudulent account creation and use activity and in the mitigating thereof. Geographic information may be associated with a payment account (e.g., a MasterCard® account number corresponding to an account in the United States of America), with an Internet protocol (IP) address associated with the creation of the account, or with a node in a content distribution network from which content is accessed. For example, if an account is created within the United States using a United States credit card account, but all streaming activity is associated with a content distribution node in Mexico, the account monitoring system may assign a high fraudulent account score to the account, which may result in automatic deletion of the account.

Other examples describing the components and the operations of account monitoring systems are provided herein. Combinations of these components and operations are within the scope of the present disclosure. Embodiments of the present disclosure may permit a service provider to maintain simple account creation and access schemes while preventing significant financial abuse and preventing account manipulation of existing loyal customers and potential future customers as well.

Referring now to FIG. 1, shown therein is a block diagram of a network environment 100 that includes an account monitoring system 102. As described herein, embodiments of the account monitoring system 102 may include an account monitoring server executing a monitoring application 104. The account monitoring system 102 may be configured to generate a fraudulent account score for each of a plurality of user accounts of a service provider system operated in connection with the account monitoring system 102. For example, the account monitoring system 102 may be operated by Netflix, Inc. of Los Gatos, Calif., which may also operate systems for the creation of user accounts and for the streaming of media content, such as movies, television shows, and other video-based and/or audio-based programming.

The account monitoring system 102 is configured in communication with a database system 106 that may include account information produced by the monitoring application 104 and/or account information processed by the monitoring application 104 in order to identify fraudulent interactions with the account creation system and other systems. The account monitoring system 102 is connected to a network 120, which may include a plurality of networks couple together. As shown in FIG. 1, network 120 may be a private network such that communication between the account monitoring system and other systems described herein may not pass over publicly available communication lines. Additionally, the network 120 may include both a private network, including a virtual private network (VPN), and a public network.

The account monitoring system 102 may be coupled to an account creation and management system 130. The account creation and management system 130, also referred to as account system 130, may interact with users as they seek to generate new accounts or to access existing accounts. The account system 130 may store or otherwise control access to a store of account identification data 132 and to a store of user consumption data 142. The account identification data 132 may be provided in a database and may have separate entries associated with each of a plurality of users. In other embodiments, the account identification data 132 includes items of data that may be individually associated with a particular user account, such as by being associated with a user identifier used within the account system 130. For example, the account identification data 132 may include one or more of the following pieces of information associated with a user account: a last name, a first name, a home address, a billing address, an email address, a phone number, a username, a profile name, a password, a profile image, and other information. The user identifier associated with a particular account may be shared with the account monitoring system 102 and with other subsystems included in the overall service provider system.

Accordingly, the account identification data 132 includes a first set of user information 134A associated with a first user and a first user account and a second set of user information 134B associated with a second user and a second user account. In some embodiments, the account system 130 may be configured to provide for multiple individual user profiles to be associated with a single user account. As illustrated, the user information 134A may be subdivided such that the information is associated with either the first user profile 136A or the second user profile 136B. In some embodiments, each profile may have a globally unique identifier. In other embodiments, the each profile may have an identifier that is unique to the associated user account.

The user account may be a video streaming account and the user information 134A includes information regarding the account owner. This information may include a username, a geographic location associated with the account, which may be a location at the time of creation of the account. The user profiles 136A and 136B may include identifiers selected for each of the profiles and/or demographic and other information associated with each of the user profiles 136A and 136B. For example, an account owner of the account associated with the user information 134A may be the head of a household that includes a parent and a child. The parent may be a primary user of the account, which may have user profiles for each of the parent and the child to enable recommendations to be tailored individually to each of these two people who access the video streaming account through the parent's user account.

Accordingly, the user consumption data 142 includes user information 144A associated with the first user and the first user account and user information 144B associated with the second user and the second user account. The user information 144A may include consumption or history information associated with individual user profiles 146A and 146B. For example, when the child watches a cartoon title using the child's profile, this activity may be recorded in the user information 144A in association with the user profile 146B. When the parent watches a documentary on World War I using the parent's profile, this activity may be recorded in the user information 144A in association with the user profile 146A. The user consumption data 142 may include a data item or entry for every start or request of a media item by a user. The data item may include information such as the user identifier of the user, a title of the media item, a numerical identifier of the media item, a time at which the media item was requested, the amount of the media item viewed, and the IP address from which the request for the media item received, and/or an identifier of the node of the content distribution network 147 used to stream the media item, which may permit a location of the content distribution network 147 to be determined. As illustrated in FIG. 1, the content distribution network 147 includes an exemplary node 149A and an exemplary node 149B. In some embodiments, the nodes 149A and 149B may represent regional operations of the content distribution network 147, such that the node 149A provides media items to consumers in the United States, while the node 149B provides media items to consumers in the European Union.

The account system 130 further includes a record of deleted accounts 148. When an account is deleted, records associated with the account may be retained for a period of time, such as six months or year. Accordingly, if a particular combination of an uncommon first name and an uncommon last name are used on several deleted accounts, the account monitoring system 102 may be able to observe this connection in the deleted account data from deleted accounts 148 and consider the uncommon first name and last name, more particularly as a combination of names, as a factor when scoring active accounts for potential fraudulent activity. The account system 130 may also function as a gatekeeper system allowing or denying access to content, which may then be provided to the user by a content delivery network.

When a user such as the user associated with user profile 136A and the user profile 146A wants to access content from the service provider, the user may use a client device 122, which may be a desktop computer, a laptop computer, a smart phone, a tablet, or any other suitable computing device to communicate over the network 120 with the account system 130.

The network environment 100 of FIG. 1 further includes an account payment system 150 which may be separate from the account system 130 as illustrated, or in other embodiments the account payment system 150 may be integrated with the account system 130. The account payment system 150 may include user payment data 152 associated with each of the plurality of accounts included in the account system 130. As illustrated in FIG. 1, the user payment data 152 includes entries such as user information 154A and user information 154B. In some embodiments, a first user may be associated with a single user identifier that is used by both the account system 130 and the account payment system 150. In other embodiments, each user may have user account identifier and a user payment identifier, which are different from each other such that the user payment identifier cannot be used to specify information included in the account system 130 and the user account identifier cannot be used to specify information included in the account payment system 150.

The user payment data 152 may include information describing, and enabling service provider to access, one or more funding sources. For example, the user information 154A may include a first name and last name associated with a first user account, as well as a first payment source identifier, and a phone number. The first payment source identifier may include a debit card account number, a credit card account number, a gift card account number, or a third-party, online payment account number. The first payment source identifier may additionally include a personal identification number (PIN) or other code required by the respective account issuer to successfully withdraw funds from the account as payment. The first payment source identifier may also include an address or other geographical location associated with the account. For example, a ZIP code or other postal code may be included in the user information 154A. In some embodiments, the user payment system 150 may communicate with a payment source issuer to confirm payment source information. Additionally, some embodiments of the user information 154A may include a second payment source identifier identifying a second payment source from which the service provider may withdraw funds according to a service agreement with the first user. Like the deleted accounts 148 of account system 130, the account payment system 150 includes deleted accounts 158. The deleted accounts 158 may include information associated with accounts that have been deleted. This information may be retained for a limited period of time and may be searched by the account monitoring system 102 during that period of time. The deleted accounts 158 may also be retained so that, in the event an account is wrongfully deleted, the service provider may be able to more easily restore the user account, including user payment information and user consumption information, associated with the wrongfully deleted account.

Some embodiments of the network environment 100 include customer service logs 160. The service provider may operate a customer service center to receive communications from users and from potential users of the streaming media service. When a customer service operator receives a phone call or a message, an address or identifier associated with the call or message such as a phone number, messaging handle, or email address may be used to identify the user account at issue in the communication in the customer service logs 160. When a user account is deleted, the associated user may contact the customer service center. When the customer service operator determines that the user account is wrongly deleted, this information may be provided to the account monitoring system 102 and may be used to refine a set of rules and/or algorithms used in generating fraudulent account scores. Similarly, when the customer service operator determines that the user account was rightfully deleted based on information received in the communication, corresponding information may be provided to the account monitoring system 102 for use in subsequent fraudulent account scoring. Accordingly, the customer service logs 160 permit the transmission of information between the customer service center and the account monitoring system 102 over the network 120. The customer service logs 160 may be used with machine-learning algorithms to improve fraudulent account scoring performance going forward.

In the illustrated embodiment of the network environment 100, the systems such as the account monitoring system 102, the account creation and management system 130, and the account payment system 150 may each be provided by a server or cluster of servers. Accordingly, the account monitoring system 102 may be a computing device that comprises or implements one or more servers and/or software components that operate to perform various operations in accordance with the described embodiments. Exemplary servers may include, for example, stand-alone and enterprise-class servers operating a server operating system (OS) such as a MICROSOFT® OS, a UNIX® OS, a LINUX® OS, or another suitable server-based operating system. It should also be appreciated that the system 102 illustrated in FIG. 1 may be deployed in other ways and that the operations performed and/or the services provided by such server or servers may be combined or separated for a given implementation and may be performed by a greater number or fewer number of individual server devices.

As described, data communications between the account monitoring system 102 and other systems and devices illustrated in FIG. 1, may be transmitted over the network 120, which may include one or more networks such as a LAN, a WAN, a WWAN, a WLAN, a mobile telephone network, a landline telephone network, as well as other suitable networks.

As described, the client device 122 shown in FIG. 1 may be a computing device that comprises or employs one or more client devices, such as a personal computer, a laptop, a mobile-computing device, such as tablet computer or a smartphone, a wearable computing device, and/or any other computing device having computing and/or communications capabilities in accordance with the described embodiments. The client device 122 includes a processing device in communication with a data storage device or memory and is able to execute instructions corresponding to system programs and application programs to perform various computing and/or communications operations. Exemplary system programs may include, without limitation, an operating system (e.g., iOS®, Android® OS, LINUX® OS, Firefox OS™, Windows®, OS X®, Binary Run-time Environment for Wireless (BREW) OS, JavaOS, a Wireless Application Protocol (WAP) OS, and others), device drivers, programming tools, utility programs, software libraries, application programming interfaces (APIs), and so forth. As shown in FIG. 1, the client device 122 executes software to provide a browser 124. The browser 124 may be a web-browsing program such as Internet Explorer®, Chrome®, etc. The client device 112 may communicate with the account system 130 and the account payment system 150 over a publically accessible portion of the network 120, such as the Internet.

Figure 2:
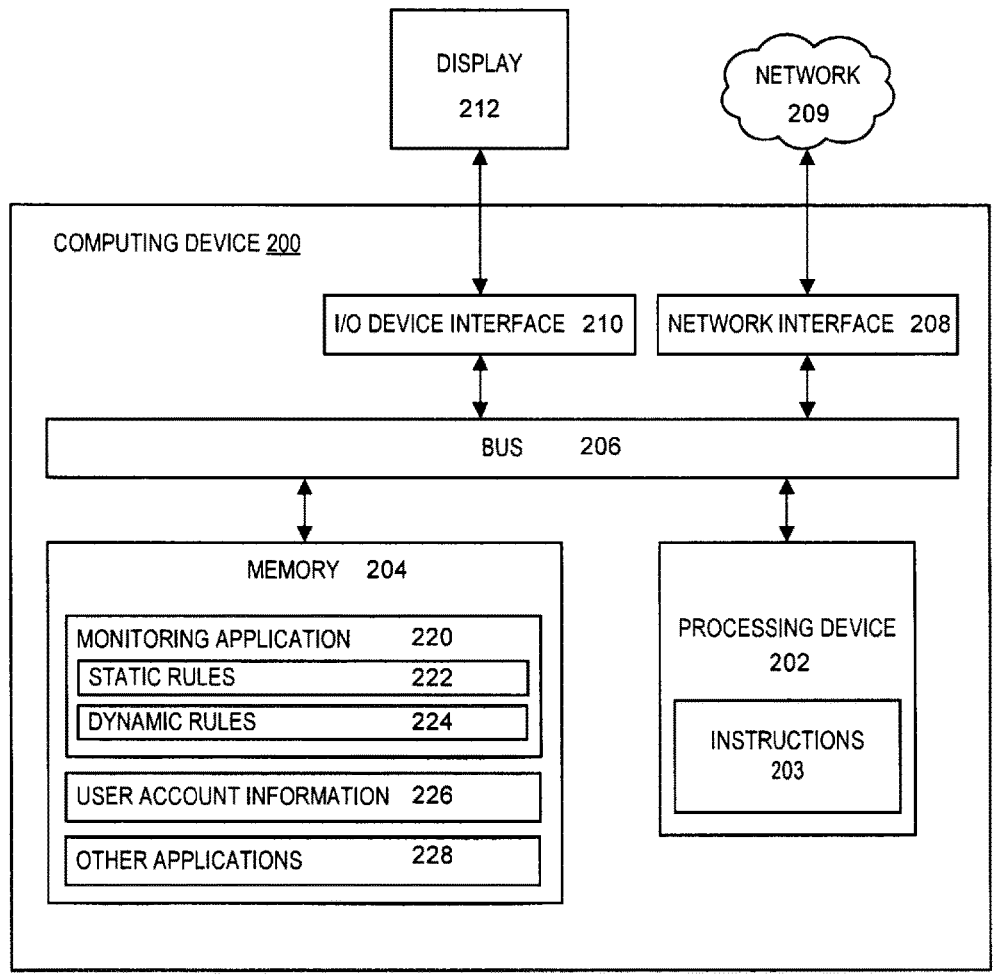
FIG. 2 is a block diagram of a computing device that may be used in the account monitoring system of FIG. 1 according to some embodiments of the present disclosure.

Referring now to FIG. 2, shown therein is an exemplary embodiment of a computing device 200, embodiments of which may provide the account monitoring system 102 (FIG. 1) as described herein. The computing device 200 includes a processing device 202, such as one or more processors or CPUs, in communication with a data storage device or memory 204 over a bus 206. The bus 206 further couples a network interface device 208 and an I/O device interface 210. The network interface device 208 may be a network interface card or network interface controller (NIC) that permits the computing device 200 to communicate with the network 209, which may be the network 120 of FIG. 1. The I/O device interface 210 enables the server to communicate information to be rendered to a display 212 to display information such as data and command options in graphical user interfaces associated therewith. The I/O device interface 210 may further communicate with I/O devices such as infra-red or radio-frequency remote controls, keyboards, mice, touchscreens, etc. in some embodiments, the I/O device interface 210 may be an application programming interface (API) by which the other systems of FIG. 1 may communicate with the account monitoring system 102.

The processing device 202 may execute software and/or other instructions 203 stored in the memory 204. For example, the monitoring application 104 of FIG. 1 may be provided by executing instructions 203 on the processing device 202. As illustrated in FIG. 2, the memory 204 stores a monitoring application 220. The monitoring application 220 may include a plurality of rules and/or algorithms that may be implemented as part of the monitoring application 220 to generate fraudulent account scores for a plurality of user accounts. Machine learning algorithms may be used to develop a set of static rules 222 and a set of dynamic rules 224 and/or the rules 222 and 224 may be manually coded into the monitoring application 104. An example of a static rule may be to add a first number of points (e.g. 20, 30 or 50 points) to a fraudulent account score of a first account when the account monitoring system 102 determines that all content (or another threshold percentage of content, such as 50% or 75%) is being streamed by devices logged into the first account is streamed to a first country while the credit card account number associated with the first account is associated with a credit card account operated by a bank in a second country. An example of a dynamic rule may be that when 10 new accounts are created in a given period of time (e.g., 1 minute, 30 minutes, or a day) using the same first name and last name, a second number of points (e.g. 20, 30, or 40 points) may be added to the fraudulent account score associated with the first account. Other static and dynamic rules are described herein. When an account triggers one of the rules 222 and/or 224, the account's score is increased and a tag may be associated with the account to more easily indicate that there is potentially fraudulent activity associated with the account. The tag may indicate the particular rule or rules that are triggered by the account with its associated activity.

The memory 204 may be a collection of memories of different types that are included in a housing of the client computing device or coupled to the computing device 200 and in communication therewith. For example, the memory 204 may include cache memory, RAM, ROM, a solid-state hard drive, a disk-based hard drive, and/or other types of non-transitory memory devices. The components depicted as stored on the memory 204 may be stored on and/or accessed from any combination of these different types of memories.

As illustrated in FIG. 2, the memory 204 includes a set of user account information 226, which may include account identification information, user consumption information, and user payment information associated with one or more user accounts. In some embodiments, when a fraudulent account score is calculated, the computing device 200 may make requests for information associated with a particular account to the account system 130 and the user payment system 150. This information may be received by the computing device 200 and placed in memory 204 and the user account information 226. The processing device 202 may perform operations according to the instructions 203 on the account information to determine the fraudulent account score of that account. In other embodiments, the fraudulent account score associated with a particular user account may be calculated as a series of events are recorded that indicate that the fraudulent account score should be modified. For example, if a new user profile is added to a first user account two weeks after the first user account is created and the content streamed in association with the new user profile is streamed within a country other than the country in which the first user account was created, the account system 130 may push corresponding information to the account monitoring system 102 with a request to update a fraudulent account score associated with the user account.

The memory 204 may further include other applications 228 that may be used in monitoring user accounts for fraudulent activity and handling accounts having more than a threshold fraudulent score value. For example, the other applications 228 may include a notification application that receives notifications from the account system 130 and/or the user payment system 150 indicating that an event has occurred such that the fraudulent account score associated with a specified account should be recalculated.

For example, the account monitoring system 102 may perform a large-scale computing job on a regular basis, such as on a nightly basis, to identify fraudulent accounts or accounts affected by fraud. The notification application may receive information indicating which user accounts should be included in the job. Thereafter, the monitoring application 220 may request appropriate user information from the account system and/or the account payment system 150 for inclusion in a MapReduce operation or operations, such as a Hadoop job, used to update or generate large numbers of fraudulent account scores in a batched process.

In some embodiments, software tools such as Hadoop and Hive may be used to gather account data for a window or period of time. Multiple tasks or jobs may concurrently interact with internal and external sources to augment the collected account data. Data from CDNs may be used to augment the collected data. Data from credit card companies or other payment processors may also be used to augment data. For example, a credit card company may suspect that an account number has been misappropriated. This may be provided to the account monitoring system 102. The tasks or jobs may pull data related to individual accounts to specific nodes in the cluster running the Hadoop framework. The tasks may be processed in different regions of the distributed computing infrastructure that is used to provide consumers with access to media items. The regions may correspond to geographic areas, such as eastern and western portions of the United States, Europe, Brazil, etc. The augmented data may then be analyzed with respect to the rules 222 and 224 to identify fraudulent activity associated with individual accounts and/or with clusters of accounts. For example, a cluster of a hundred to more than a thousand accounts may be identified as being associated within common fraudulent activity, by combining IP address information with device ID that are common to the cluster of accounts. For example, if a single device ID is associated with many different accounts, this may indicate that all those accounts are part of fraudulent activity being conducted by an operator of the device associated with the device ID.

Referring now to FIGS. 3A, 3B, and 3C, shown therein are exemplary databases containing account information that may be used by the account monitoring system 102 in order to detect fraudulent account activity. FIG. 3A illustrates an exemplary user consumption database 300. Embodiments of the user consumption database 300 may include entries 302, 304, 306, and 308 detailing the reviewing history or consumption associated with a plurality of user accounts, including information indicating which profile associated with the particular user account of the plurality of accounts was used in requesting the specified title. Each entry includes a user identifier, which may be an alphanumeric number associated with each user, and a profile identifier indicating which profile associated with the identified account was used to request the content. Each entry further may further a title or content item identification number identifying the requested content, a date and/or time of day at which the content was requested, and an access location identifying a geographic or system based location indicating where the content was streamed or otherwise provided. For example, the entries 304 and 306 may be associated with a single user account, having profiles identified by the user identifier 0707, each user profile has an account unique identifier. As illustrated the account associated with user identifier 0707 has at least three profiles. These profiles may be identified as 0707-1, 0707-2, and 0707-3, or by another convention. The user profiles associated with entries 304 (0707-1) and 306 (0707-3) appear to be streaming or otherwise access media items for consumption in graphic locations separated by a large distance. This may be an indication that one profile is being used without the consent or authorization of the account owner, as authorized sharing generally occurs within a smaller geographic area, such as within a single city or a single sub-national region. Particularly, this may indicate an account takeover fraud. In an account takeover fraud, the bad actor may not change a password or otherwise seek to exclusively control an account. The bad actor may simple access the service without payment using another person's account.

Because the user consumption database 300 includes entries 306 and 308 associated with particular profiles, the database 300 may indicate that the various profiles of a particular account associated with these profiles are being used to access content from multiple different countries. This may indicate that there is fraudulent sharing of the account taking place. Additionally, the number of profiles associated with a particular account may also indicate potential fraud. While in some embodiments, a number of profiles associated with a particular account may be capped to a certain number, other embodiments may not cap the number of profiles. As fraudulent users share their account with more and more people, more and more profiles may be created in order to allow the fraudulent users to enjoy a more customized experience. As another example, the entry 308, associated with the user identifier number 5978 indicates that only about 30 seconds of the title "Alien Secrets of WWII" has been accessed. If this is the only streaming activity, the lack of streaming activity may be indicative of fraudulent account activity, such as card running. In general, if an amount of content accessed is substantially zero (e.g., less than 5 minutes or 10 minutes), the account monitoring system 102 may give a high fraudulent account score or add a high number of fraudulent account score points to the user account. In some embodiments, if a substantial amount of content is consumed in a language that is different from the language of the country in which the account originated, the account monitoring system 102 may increase the fraudulent account score.

Other indicators of fraudulent activity may include the signup country (the country from which the valid payment method was received and the account was activated) being different from the country to which media items are streamed, the country of registration being different (the country from which the email associated with the account was entered and the customer ID was generated) from the signup country. This may happen when the bad actors are using a VPN and they change the country of origin during the registration process depending on the country where the stolen card was issued. Other indicators may be content or language based. For example, Mexican telenovelas being the only consumed content from an account based in the UK may indicate fraud. A change in the country from which the content is consumed, such as an Australian account starting to stream media items in Brazil or different profiles associated with the same account consuming content from different countries or the same profile streaming from different countries or geographical boundaries may indicate fraud. Additionally, a spike in the number of devices used for content consumption by a single account may indicate fraud. This indicates may be embodied or coded into the rules 222 and 224.

Referring now to FIG. 3B, shown therein is a user payment database 320 that includes entries 322, 324, 326, and 328 associated with a plurality of user accounts. In some embodiments, the user payment database 320 includes actually processed payments. As illustrated, the user payment database 320 includes user payment information that may be used by the service provider to receive payment in the future. Accordingly, each entry in the user payment database 320 includes a user identifier, a payment source identifier (e.g., American Express®, Visa®, PayPal®, or other identified source), a type of payment source (e.g., a credit account, a debit account, a checking account, a gift card account, an online payment account), and account number or other account-specific identifier such as a username, and a payment source location. The payment source location may be a national level location corresponding to a location of the payment source issuer. For example, the user payment database 320 may indicate that a user, identified in entry 322 as user identifier 1533, has provided information for a Deutsche Bank issued credit card that is based in Germany. The account monitoring system 102 may compare the access location provided in the user consumption database 300, which indicates that the user account identified by user identifier 1533 streams content from United States content distribution network (CDN) node number 4, with the source location of the payment source associated with the account, which is Germany. If all the streamed content has been streamed within the United States, or a large proportion thereof (e.g., over 40% or over 60%) while the payment source is associated with a German bank account, the account monitoring system 102 may increase or add to a fraudulent account score associated with the user account identified by user identifier 1533.

Referring now to FIG. 3C, shown therein is a user identification database 340 that illustrates an exemplary database of user identification information. As illustrated in FIG. 3C, each entry of entries 342, 344, 346, and 348 of the user identification database 340 includes a user identifier, a first name, last name, and email address, and a creation location, which may be an IP address from which the account was created or may be a geographic location associated with that IP address. In some embodiments of the user identification database 340, each entry or some of the entries may include address information, such as a billing address residential address. The account monitoring system 102 may use information obtained from the user identification database 340 to generate or update a fraudulent account score. In some embodiments, incorrectly entered information may be interpreted by the account monitoring system 102 to indicate an increased likelihood of fraud. For example, the account identified by the user identifier 0707 (entry 346) lists xyz@abc.com as the first name of the user. This email address is also listed as the email address associated with the account. Because "xyz@abc.com" is not a personal name, this may indicate that it was not a person that entered the information, but instead was an automated script or other tool used by a bad actor to try to use the account system 130 for fraudulent purposes. Accordingly, the account monitoring system 102 may add points to or otherwise increase a fraudulent account score associated with this user. Additionally, the user identified by the user identifier 1533 (entry 342) includes an email address "7ab6@freeflix.com."

The account monitoring system 102 may include in its memory, a list of email domains that indicate a high probability of fraud, such as free trial abuse or fraud. For example, the list of email domains may include domain such as lifetimefreeflix.com, cuentasfreeflix.com, fraudsters.com, etc. Whenever a domain name appearing on the list of email domains is used to create a new user account, the account monitoring system 102 may increase a fraudulent account score or generate a high fraudulent account score. For example, the fraudulent account monitoring system 102 may add 60 points, 70 points, or 90 points, for example, to the fraudulent account score of the related user account. Additionally, some email domains are known to provide single use or "throwaway" email accounts. Such email domains may also be included in the list of email domains that indicate a high probability of fraud. In some embodiments, a domain associated with a business (e.g., mcdonalds.com or wholefoods.com) rather than a free email service (e.g. gmail.com or outlook.com) may be used to decrease a fraudulent account score relative to user accounts associated with free email services. This may be done by decreasing a fraudulent account score associated with the business-domain email address or by increasing a fraudulent account score associated with the free email account domain.

When verifiable information is provided during the account creation process, a user account may be created even when the information is not verified. For example, a user may enter an email address of "abc@xyz.com" during the account creation process. The account system 130 may send an email to that email address. If the email address is not valid, the account system 130 may receive an error notification. The account system 130 may continue to create the account for the user, while flagging the account as potentially fraudulent. The account may be monitored during a period of time to determine if other indicators of fraud or misuse arise. By waiting for the period of time, the service provider may build goodwill with a customer who erroneously entered his or her email address. Similarly, in some embodiments, a user account may be created even though payment information is not be confirmed by the payment source issuer. After a period of time, such as during a free trial period, the account monitoring system 102 may calculate a fraudulent account score based on the unverified payment information and any other indicators present at the time the user account was created or that have arisen afterward.

Other aspects of the information contained in the user identification database 340 may indicate an increased likelihood of fraudulent activity. For example, a first name and or a last name that appeared to be random strings of letters, rather than actual proper names may indicate that the account is likely fraudulent. The account monitoring system 102 may be configured to compare the first name and last name provided by a user to the account generation process with a database of names or with a speech algorithm that determines whether the name is pronounceable according to standard rules or not. When the first name is the same as the last name, the account monitoring system may increase the fraudulent account score. Similarly, when multiple user accounts use a single uncommon combination of a specific first and last name, such as "Pete Chiaracatta" (entry 348), the account monitoring system 102 may increase the fraudulent account score. Numerals used in either the first or last name may also increase the fraudulent account score associated with the account. When several active or inactive accounts share an uncommon password, such as a seemingly random string of characters, the account monitoring system 102 may indicate that these accounts are more likely to be associated with fraud.

The account monitoring system 102 may retrieve information or receive information corresponding to the exemplary user consumption database 300, the user payment database 320, and/or the user identification database 340 as illustrated in FIGS. 3A, 3B, and 3C. This information may be collected over a period of time, such as a week, two weeks, or more. The account monitoring system 102 may be activated continuously or periodically, such that the fraudulent account scores may be updated continuously or periodically. In one embodiment, the account monitoring system 102 may be activated on a weekly basis, rather than continuously as this may result in improved accuracy in the identification of fraud relating to user accounts, even though this may result in permitting some fraudulent activity to occur. In another embodiment, the account monitoring system 102 may calculate a fraudulent account score at a pre-determined time, such as one day or one week, before an end of a trial period.

As described herein, one or more thresholds may be used by the account monitoring system 102 in determining whether a user account is fraudulent or is being used fraudulently or whether it is not. For example, when a user account receives a fraudulent account score of greater than 80%, the user account may be deemed fraudulent and may be deleted, without intervention such as approval by a customer service representative. When a user account receives a fraudulent score that is lower than 80%, the upper threshold fraudulent score value, but that is higher than a lower threshold fraudulent score value, such as 50% or 60%, the account monitoring system 102 may communicate with the account system 130 to tag or flag the account as potentially fraudulent. In some embodiments, the account monitoring system 102 may maintain a list of such potentially fraudulent accounts. These accounts may continue to be monitored beyond a normal period of time, such as a free trial period, in order to have more information upon which to make the determination. Additionally, in some embodiments the account monitoring system 102 may refer potentially fraudulent accounts to a customer service system associated with the service provider by an electronic communication such as an email or a notification. The customer service system may then attempt to make contact with the owner of the potentially fraudulent accounts to seek additional information.

Figure 4:
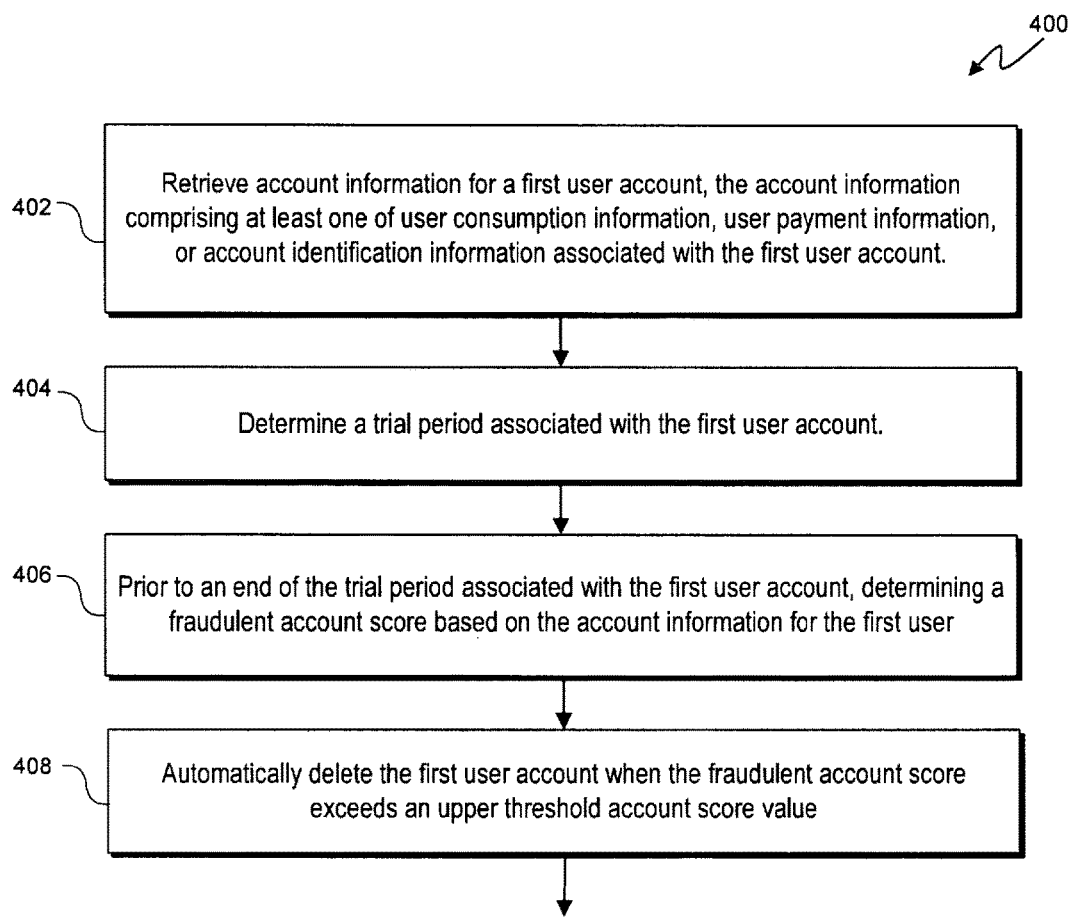
FIG. 4 is a flowchart illustrating a method of detecting and handling fraudulent accounts created in the network environment of FIG. 1, according to some embodiments of the present disclosure.

Referring now to FIG. 4, shown therein is flowchart of a method 400 for detecting fraudulent accounts and handling those fraudulent accounts. As illustrated, method 400 includes several enumerated steps or operations. Embodiments of the method 400 may include additional steps or operations before, after, in between, or as part of the enumerated operations. Some embodiments of the present disclosure include instructions like the instructions 203 of FIG. 2 stored on a non-transitory computer-readable storage medium, like the memory 204 of FIG. 2. When executed, the instructions may cause a processing device, like the processing device 202 of computing device 200 to perform operations associated with embodiments of the method 400. Embodiments of the method 400 may be performed by execution of an application, such as the monitoring applications 104 and 220 of FIGS. 1 and 2, respectively.

Embodiments of the method 400 may begin at step 402 at which a processing device in communication with one or more storage devices storing account information retrieves account information for a first user account. The account information may include at least one of user consumption information, user payment information, or account identification information associated with the first user account. For example, the processing device 202 of FIG. 2 may execute instructions 203 causing the processing device 202 to communicate over network 120 with the account creation and management system 130 and/or the account payment system 150 of FIG. 1. The account identification data 132 may include one or more of the following pieces of information associated with the first user account: a last name, a first name, a home address, a billing address, an email address, a phone number, a username, a profile name, a password, a profile image, and other information. The user consumption information may include titles or content identifiers identifying one or more media items consumed (e.g., downloaded or streamed) by the user, an identifier of the profile used to consume each media item, a time at which the media item was accessed or requested, a percent or amount of the media item consumed, and access location associated with each media item. For example, the access location may identify a location indicated by an IP address used to request the media item or the access location may identify a content distribution network node from which the media item was accessed. For example, the access location may indicate that the media item was accessed from the node 149B of the content distribution network 147. The user payment information may include a user identifier, a payment source identifier (e.g., American Express®, Visa®, PayPal®, or other identified source), a type of payment source (e.g., a credit account, a debit account, a checking account, a gift card account, an online payment account), and account number or other account-specific identifier such as a username, and a payment source location.

At step 404, the processing device may determine a trial period associated with the first user account. In some embodiments, the first user account may be a newly or recently created account that is still a free trial period as described herein. If the first user account is not a newly or recently created account (e.g., is an account that is not in a free trial or has been in existence for a predetermined period of time such as two or three months) the processing device may determine that the trial period associated with the first user account has expired. For example, the processing device 202 of the computing device 200 of FIG. 2 may communicate with the account system 130 to access user information 134A. The user information 134A may indicate a date on which the first user account was created. In some embodiments, the account monitoring system 102 may determine based on the date on which the first user account was created whether the trial period associated with the first user account is ongoing and, if so, how much time is left in the free trial period. In other embodiments, user information 134A may indicate an end date of the free trial period.

At step 406, the processing device may determine a fraudulent account score for the first user account. The fraudulent account score is based on the account information for the first user account. The fraudulent account score may be determined prior to an end of the trial period associated with the first user account, in some embodiments. In other embodiments, the fraudulent account score may be determined or updated after the end of the trial period associated with the first user account. Accordingly, the account monitoring system 102 may be used to monitor accounts that have not been newly created (e.g., accounts that are beyond their free trial period). In this manner, fraudulent activity associated with existing accounts, such as unauthorized use of the account, may be detected by the account monitoring system. For example, the processing device 202 may execute instructions 203 to provide for the monitoring application 220. To determine the fraudulent account score, the monitoring application 220 may apply one or more of static rules 222 and dynamic rules 224. The rules 222 and 224 may be generated from a machine-learning algorithm operating on larger data sets including user accounts that have been identified as being associated with fraudulent activity. The rules 222 and 224 may assign points based on the rule triggered by the user account information received by the processing device 202. As described herein, the processing device 202 may determine that an email address provided in the creation of the first user account is associated with a list of email domains that are indicative of fraudulent activity, such as free trial abuse. As another example, where a large number of accounts have been created in a short amount of time from a specific IP address, subsequent accounts created from that specific IP address may be determined to be more likely to involve fraudulent activity. Such a spike in activity from a specific IP address may indicate an automated script being used to verify financial account information, such as a credit card account number. The rules 222 and 224 may vary in degree of predictiveness of fraud, and so may be associated with different points or score adjustments. For example, a single IP being associated with multiple accounts may be a weak indicator with lower points than a single device being used to create multiple accounts. In some embodiments, automatic action may be taken with respect to an account only if a strong indicator or strong rule is triggered.

At step 408, the processing device may automatically delete the first user account, when the fraudulent account score exceeds an upper threshold account score value. For example, the processing device 202 of the computing device 200 or the account monitoring system 102 may delete the first user account, causing information associated with the first user account contained in the account identification data 132, the user consumption data 142, and/or the user payment data 152 to be moved to deleted accounts 148 and/or 158. The deleted user account information may be stored for a period of time so that the information may be provided to machine learning algorithms in order to generate improved static rules 222 and dynamic rules 224. When the fraudulent account score is less than the upper threshold account score value but is greater than a lower threshold account score value, the first account may be automatically tagged. The tagged first user account may be reviewed again by the account monitoring system 102 after additional information resulting from account activity of the first user account is obtained. The tagged first user account may also be brought to the attention of a customer service representative who may use contact information included in the first user account to attempt to establish whether or not fraudulent activity is taking place with respect to the first user account. The threshold account score values may be different based on the country or jurisdiction (or countries or jurisdictions) associated with a particular account or the type of payment associated with the account. Historical fraud patterns or other factors may be factored into the threshold account score values as well.

In some embodiments, the method 400 may include assigning a fraudulent activity tag or tags to the first user account. The fraudulent activity tag may indicate a particular type of fraudulent activity indicated by the account monitoring system 102 based on the accessed user account information. For example, such a tag may be one of a credit card validation fraud tag identifying the account as resulting from a credit card validation attempt, a free trial fraud tag identifying the account as resulting from an attempt to misuse a free trial account, an account takeover tag identifying the account as being accessed without consent of a legal owner of the first user account.

Additionally, in some embodiments of the method 400 the processing device may request and/or receive call log information from a customer service system. The call log information may identify the first user account and provide additional information regarding the first user account. For example, the call log information may include an indication from a customer service representative to the status of the first user account as associated with fraudulent activity or not.

Embodiments of the presently disclosed systems, servers, devices, and methods may provide for fraudulent account detection and handling. Some embodiments of the present disclosure may permit potentially fraudulent activity to continue in order to better assess the nature of potentially fraudulent accounts. Because some embodiments of the present disclosure may determine a fraudulent status of a user account before any charges are assessed against an associated financial account, financial losses may be minimal and good will with potential consumers and existing consumers may be maintained as fraudulent charges may still be avoided. When it is determined that a user account is very likely to be fraudulent, that account may be deleted or changed from an active state to an inactive state such that it can no longer be used to access media content. Certain aspects of the present disclosure are set out the following numbered clauses:

1. A system for monitoring account activity in an online streaming media environment, the system comprising: an account monitoring system having a processing device in communication with a plurality of storage systems including at least a first storage system and a second storage system, an account creation and management system having account identification information and user consumption information stored on the first storage system of the plurality of storage systems; and an account payment system having user payment information stored on a second storage system of the plurality of storage systems, and wherein the account monitoring system is coupled to the account creation and management system and the account payment system via a network, and wherein the processing device of the account monitoring system: retrieves account information for a first user account, the account information comprising user consumption information and the user payment information associated with the first user account; determines a fraudulent account score for the first user account, wherein the fraudulent account score is based on at least one of the user consumption information, the user payment information, and account identification information; and when the fraudulent account score exceeds an upper threshold account score value, automatically deletes the first user account from at least one of the account creation and management system and the accounts payment system.

2. The system of clause 1, wherein the account monitoring system is to determine the fraudulent account score for the first user based the user consumption information, the user consumption information comprising at least one of: an interne protocol (IP) address associated with the first user account; a geographic location indicated by a content distribution node that has delivered content to devices associated with the first user account; a list of the devices associated with the first user account; and an amount of content consumed by devices in the list of the devices associated with the first user account.

3. The system of any of clauses 1-2, wherein a geographic location of the IP address associated with the first user account is different than a geographic location indicated by the content distribution node.

4. The system of any of clauses 1-3, wherein the amount of content consumed by the devices associated with the first user account is substantially zero.

5. The system of any of clauses 1-4, wherein the user consumption information comprises consumption information for each of a plurality of user profiles associated with the first user account.

6. The system of any of clauses 1-5, wherein automatically deleting the first user account comprises associated a fraudulent status tag with the first user account.

7. The system of any of clauses 1-6, wherein the fraudulent status tag is one of: a credit card validation fraud tag identifying the account as resulting from a credit card validation attempt; a free trial fraud tag identifying the account as resulting from an attempt to misuse a free trial account; or an account takeover tag identifying the account as being accessed without consent of a legal owner of the first user account.

8. The system of any of clauses 1-7, wherein the user payment information comprises a credit card account number, wherein the account payment system communicates with a card issuer system to determine whether the credit card account number is valid.

9. The system of any of clauses 1-8, wherein the account identification information comprises at least one of: an email address included on a list of fraud-indicating domains; an improperly formatted name; or a name previously associated with a fraudulent account.

10. The system of any of clauses 1-9, wherein the account monitoring system is further operable to: determine when the fraudulent account score exceeds a lower threshold account score value; and include the first user account with a list of potentially fraudulent accounts when the fraudulent account score exceeds the lower threshold account value score and does not exceed the upper threshold account score value.

11. The system of any of clauses 1-10, wherein account monitoring system is further operable to determine the fraudulent account score at a pre-determined time before an end of a trial period.

11.1 A non-transitory computer-readable storage medium storing instructions that, when executed by one or more processing devices, cause the processing devices to perform any of the features recited in any of clauses 1-11.

11.2. A computer program product including instructions that, when implemented on one or more processing devices, carries out any of the features recited in any of clauses 1-11.

11.3. A method that, when implemented by one or more processing devices, performs operations providing any of the features recited in any of clauses 1-11.

12. A server system for monitoring user account activity, the server system comprising: a processing device in communication with a plurality of storage systems including at least a first storage system and a second storage system; a local storage device in communication with the processing device, the local storage device comprising an fraudulent account detection application, wherein the processing device executes the fraudulent account detection application to: retrieve, from at least one of the first and second storage systems, account information for a first user account; determine an end date of a trial period associated with the first user account; determine, prior to an end date of the trial period, a fraudulent account score for the first user account, wherein the fraudulent account score is based on the account information for the first user account; and when the fraudulent account score exceeds an upper threshold account score value, automatically sending an instruction to delete the first user account to an account administration system.

13. The server system of clause 12, wherein the determining the fraudulent account score comprises processing a Hadoop job comprising account information for a plurality of user accounts.

14. The server system of any of clauses 12-13, wherein the account information for the first user account comprises: user consumption information identifying items consumed in connection with the first user account; user payment information identifying a payment source associated with the first user account; and account identification information.

15. The server system of any of clauses 12, wherein the processing device further executes the fraudulent detection application to: determine, prior to the end date of the trial period, that the fraudulent account score exceeds a lower threshold account score value; and include the first user account with a list of potentially fraudulent accounts when the fraudulent account score exceeds the lower threshold account value score and does not exceed the upper threshold account score value.

16. The server system of any of clauses 15, wherein the processing device is in communication with a payment processing system and wherein the processing device executes the fraudulent account detection application to request verification of a payment source included in the account information for the first user account.

16.1 A non-transitory computer-readable storage medium storing instructions that, when executed by one or more processing devices, cause the processing devices to perform any of the features recited in any of clauses 12-16.

16.2. A computer program product including instructions that, when implemented on one or more processing devices, carries out any of the features recited in any of clauses 12-16.

16.3. A method that, when implemented by one or more processing devices, performs operations providing any of the features recited in any of clauses 12-16.

17. A method comprising: retrieving, by a processing device in communication with one or more storage devices storing account information, account information for a first user account, the account information comprising at least one of user consumption information, user payment information, or account identification information associated with the first user account; determining a trial period associated with the first user account; prior to an end of the trial period associated with the first user account, determining, by the processing device, a fraudulent account score for the first user account, wherein the fraudulent account score is based on the account information for the first user account; and when the fraudulent account score exceeds an upper threshold account score value, automatically deleting the first user account.

18. The method of clause 17, further comprising verifying an email address associated with the first user account and verifying a payment source associated with the first user account.

19. The method of any of clauses 17-18, wherein automatically deleting the first user account comprises identifying the first user account as fraudulent in a deleted account database.

20. The method of any of clauses 17-19, further comprising receiving call log information from a customer service system, the call log information identifying the first user account and wherein a portion of call log information is included in the deleted account database.

20.1 A non-transitory computer-readable storage medium storing instructions that, when executed by one or more processing devices, cause the processing devices to perform any of the features recited in any of clauses 17-20.

20.2. A computer program product including instructions that, when implemented on one or more processing devices, carries out any of the features recited in any of clauses 17-20.

20.2. A computing system that, when implemented by one or more processing devices, performs operations providing any of the features recited in any of clauses 17-20.

Although the foregoing aspects of the present disclosure have been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A system for monitoring account activity in an online streaming media environment, the system comprising:
   an account monitoring system having a processing device in communication with a plurality of storage systems including at least a first storage system and a second storage system;
   an account creation and management system having account identification information and user consumption information stored on the first storage system of the plurality of storage systems; and
   an account payment system having user payment information stored on a second storage system of the plurality of storage systems, and
   wherein the account monitoring system is coupled to the account creation and management system and the account payment system via a network, and wherein the processing device of the account monitoring system:
      retrieves account information for a first user account, the first user account granting access to media content from an online media streaming service, the account information comprising user consumption information and the user payment information associated with the first user account;
      determines a fraudulent account score for the first user account, wherein the fraudulent account score is based on at least one of the user consumption information, the user payment information, and account identification information; and
      when the fraudulent account score exceeds an upper threshold account score value, automatically deletes the first user account from at least one of the account creation and management system and the accounts payment system.

2. The system of claim 1, wherein the account monitoring system is to determine the fraudulent account score for the first user based the user consumption information, the user consumption information comprising at least one of:
   an internet protocol (IP) address associated with the first user account;
   a geographic location indicated by a content distribution node that has delivered content to devices associated with the first user account;
   a list of the devices associated with the first user account; and
   an amount of content consumed by devices in the list of the devices associated with the first user account.

3. The system of claim 2, wherein a geographic location of the IP address associated with the first user account is different than a geographic location indicated by the content distribution node.

4. The system of claim 2, wherein the amount of content consumed by the devices associated with the first user account is substantially zero.

5. The system of claim 1, wherein the user consumption information comprises consumption information for each of a plurality of user profiles associated with the first user account.

6. The system of claim 1, wherein automatically deleting the first user account comprises associated a fraudulent status tag with the first user account.

7. The system of claim 6, wherein the fraudulent status tag is one of:
   a credit card validation fraud tag identifying the account as resulting from a credit card validation attempt;
   a free trial fraud tag identifying the account as resulting from an attempt to misuse a free trial account; or
   an account takeover tag identifying the account as being accessed without consent of a legal owner of the first user account.

8. The system of claim 1, wherein the user payment information comprises a credit card account number, wherein the account payment system communicates with a card issuer system to determine whether the credit card account number is valid.

9. The system of claim 1, wherein the account identification information comprises at least one of:

an email address included on a list of fraud-indicating domains;
an improperly formatted name; or
a name previously associated with a fraudulent account.

10. The system of claim 1, wherein the account monitoring system is further operable to:
determine when the fraudulent account score exceeds a lower threshold account score value; and
include the first user account with a list of potentially fraudulent accounts when the fraudulent account score exceeds the lower threshold account value score and does not exceed the upper threshold account score value.

11. The system of claim 1, wherein account monitoring system is further operable to determine the fraudulent account score at a pre-determined time before an end of a trial period.

12. A server system for monitoring user account activity, the server system comprising:
a processing device in communication with a plurality of storage systems including at least a first storage system and a second storage system;
a local storage device in communication with the processing device, the local storage device comprising an fraudulent account detection application, wherein the processing device executes the fraudulent account detection application to:
retrieve, from at least one of the first and second storage systems, account information for a first user account, the first user account granting access to media content from an online media streaming service;
determine an end date of a trial period associated with the first user account;
determine, prior to an end date of the trial period, a fraudulent account score for the first user account, wherein the fraudulent account score is based on the account information for the first user account; and
when the fraudulent account score exceeds an upper threshold account score value, automatically sending an instruction to delete the first user account to an account administration system.

13. The server system of claim 12, wherein the determining the fraudulent account score comprises processing a job comprising account information for a plurality of user accounts.

14. The server system of claim 12, wherein the account information for the first user account comprises:
user consumption information identifying items consumed in connection with the first user account;
user payment information identifying a payment source associated with the first user account; and
account identification information.

15. The server system of claim 12, wherein the processing device further executes the fraudulent detection application to:
determine, prior to the end date of the trial period, that the fraudulent account score exceeds a lower threshold account score value; and
include the first user account with a list of potentially fraudulent accounts when the fraudulent account score exceeds the lower threshold account value score and does not exceed the upper threshold account score value.

16. The server system of claim 15, wherein the processing device is in communication with a payment processing system and wherein the processing device executes the fraudulent account detection application to request verification of a payment source included in the account information for the first user account.

17. A method comprising:
retrieving, by a processing device in communication with one or more storage devices storing account information, account information for a first user account, the first user account granting access to media content from an online media streaming service, the account information comprising at least one of user consumption information, user payment information, or account identification information associated with the first user account;
determining a trial period associated with the first user account;
prior to an end of the trial period associated with the first user account, determining, by the processing device, a fraudulent account score for the first user account, wherein the fraudulent account score is based on the account information for the first user account; and
when the fraudulent account score exceeds an upper threshold account score value, automatically deleting the first user account.

18. The method of claim 17, further comprising verifying an email address associated with the first user account and verifying a payment source associated with the first user account.

19. The method of claim 17, wherein automatically deleting the first user account comprises identifying the first user account as fraudulent in a deleted account database.

20. The method of claim 19, further comprising receiving call log information from a customer service system, the call log information identifying the first user account and wherein a portion of call log information is included in the deleted account database.

* * * * *